US010411575B2

(12) United States Patent
Takeda et al.

(10) Patent No.: US 10,411,575 B2
(45) Date of Patent: Sep. 10, 2019

(54) LINEAR ACTUATOR (71) Applicant: NIDEC SANKYO CORPORATION, Suwa-gun, Nagano (JP)

(72) Inventors: Tadashi Takeda, Nagano (JP); Hiroshi Kitahara, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 222 days.

(21) Appl. No.: 15/127,161

(22) PCT Filed: Mar. 17, 2015

(86) PCT No.: PCT/JP2015/057781
§ 371 (c)(1),
(2) Date: Sep. 19, 2016

(87) PCT Pub. No.: WO2015/141648
PCT Pub. Date: Sep. 24, 2015

(65) Prior Publication Data
US 2017/0110952 A1 Apr. 20, 2017

(30) Foreign Application Priority Data

Mar. 17, 2014 (JP) .................................. 2014-052874
Nov. 26, 2014 (JP) .................................. 2014-239172

(51) Int. Cl.
*H02K 41/00* (2006.01)
*H02K 33/16* (2006.01)
*H02K 1/12* (2006.01)
*H02K 1/34* (2006.01)
*H01F 7/08* (2006.01)
(Continued)

(52) U.S. Cl.
CPC ............. *H02K 33/16* (2013.01); *H01F 7/088* (2013.01); *H01F 7/1615* (2013.01); *H02K 1/12* (2013.01); *H02K 1/34* (2013.01); *H02K 33/02* (2013.01); *H02K 5/24* (2013.01); *H02K 7/086* (2013.01); *H02K 2213/03* (2013.01)

(58) Field of Classification Search
CPC ............. H02K 33/16; H02K 1/12; H02K 1/34
USPC ........................................................... 310/14
See application file for complete search history.

(56) References Cited

U.S. PATENT DOCUMENTS

2011/0062804 A1* 3/2011 Lee ........................ H02K 33/18
310/30

FOREIGN PATENT DOCUMENTS

JP 2002078310 A 3/2002
JP 2006007161 A 1/2006
(Continued)

OTHER PUBLICATIONS

International Search Report corresponding to Application No. PCT/JP2015/057781; dated Jun. 9, 2015, with English translation.

*Primary Examiner* — Jianchun Qin
(74) *Attorney, Agent, or Firm* — Cantor Colburn LLP (57) ABSTRACT

A linear actuator may include a stator; a movable element; a spring member connected to the movable element and the stator and structured to support the movable element in such a way as to be movable with respect to the stator in a direction of an axis line; a magnetic drive mechanism structured to drive the movable element in the direction of the axis line; and a gel damper member placed at a position on a center line of the movable element or one of a group of positions surrounding the center line, between the stator and the movable element.

21 Claims, 6 Drawing Sheets

(51) Int. Cl.
*H01F 7/16* (2006.01)
*H02K 33/02* (2006.01)
*H02K 5/24* (2006.01)
*H02K 7/08* (2006.01)

(56) References Cited

FOREIGN PATENT DOCUMENTS

| JP | 2007229582 A | * | 9/2007 | ............. B06B 1/045 |
|----|--------------|---|--------|--------------------------|
| JP | 2009166016 A |   | 7/2009 |                          |
| JP | 2010260043 A |   | 11/2010|                          |
| JP | 2011055564 A | * | 3/2011 |                          |

* cited by examiner

FIG. 6

LINEAR ACTUATOR

CROSS REFERENCE TO RELATED APPLICATIONS

This is the U.S. national stage of application No. PCT/JP2015/057781, filed on Mar. 17, 2015. Priority under 35 U.S.C. § 119(a) and 35 U.S.C. § 365(b) is claimed from Japanese Application No. 2014-052874, filed Mar. 17, 2014, and Japanese Application No. 2014-239172, filed Nov. 26, 2014, the disclosures of which is incorporated herein by reference.

FIELD OF THE INVENTION

The present invention relates to a linear actuator provided with a magnetic drive mechanism.

BACKGROUND

As a linear actuator for driving a plunger as a movable element in an axial direction; there is proposed a configuration in which a magnetic drive mechanism equipped with a coil and a permanent magnet is provided, wherein a coil spring being coaxial with the plunger contacts the plunger (refer to Patent Document 1).

Moreover, as a linear actuator for driving a movable element in an axial direction; there is proposed a configuration in which a magnetic drive mechanism equipped with a coil and a permanent magnet is provided, wherein a sheeted elastic member or an elastic member composed of a coil spring is placed between a movable element and a stator (refer to Patent Document 2).

PATENT DOCUMENTS

Patent Document 1: Japanese Unexamined Patent Application Publication No. 2002-78310
Patent Document 2: Japanese Unexamined Patent Application Publication No. 2006-7161

In the case of such a configuration, as described in Patent Document 1, where a magnetic drive mechanism is employed for driving a movable element, wherein a coil spring contacts the movable element; there exists a problem that a resonance is generated, depending on a frequency at which the movable element is reciprocated, in such a way that it becomes impossible to control operation of the movable element.

In the case of such a configuration, as described in Patent Document 2, where a magnetic drive mechanism is employed for driving a movable element, wherein an elastic member is provided between a movable element and a stator; there exists a problem that a resonance is generated, depending on a frequency at which the movable element is reciprocated, in such a way that it becomes impossible to control operation of the movable element.

SUMMARY

With the problems described above being taken into consideration, at least an embodiment of the present invention provides a linear actuator; in which a magnetic drive mechanism is employed for driving a movable element, and a resonance of the movable element can effectively be suppressed even in the case where a spring member is connected to the movable element.

In order to solve the problems described above, a linear actuator may include: a stator; a movable element; a spring member connected to the movable element and the stator, in order to support the movable element in such a way as to be movable with respect to the stator in a direction of an axis line: a magnetic drive mechanism for driving the movable element in the direction of the axis line; and a gel damper member placed at least, at either one of a position on a center line of the movable element and a group of positions surrounding the center line, between the stator and the movable element.

In at least an embodiment of the invention, the magnetic drive mechanism is employed for driving the movable element, and the spring member is connected between the movable element and the stator. Therefore, the movable element can be driven in the direction of the axis line, by making use of a driving force by the magnetic drive mechanism and a biasing force by the spring member. Even according to this configuration, since the gel damper member is provided between the stator and the movable element in at least an embodiment of the present invention, a resonance of the movable element can be suppressed. Moreover, the gel damper member is provided at least, at either one of a position on the axis line and a group of positions surrounding the axis line, and therefore a resonance of the movable element can effectively be suppressed.

In at least an embodiment of the invention, it is preferable that the spring member is a plate-like spring component comprising: a stator side connection part connected to the stator; a movable element side connection part connected to the movable element; and an arm part connected to the stator side connection part and the movable element side connection part. According to the configuration, an area occupied by the spring member can be narrowed in the direction of the axis line.

In at least an embodiment of the invention, it is preferable that the gel damper member is adhered and fixed to both the movable element and the stator. According to the configuration, it becomes possible to prevent the gel damper member from displacement in association with the movement of the movable element. Moreover, even when the movable element moves in a direction for becoming distant from the stator at a position where the gel damper member is provided, the gel damper member becomes deformed in association with the movement so that a resonance of the movable element can effectively be suppressed.

In at least an embodiment of the invention, employed may be a configuration in which the stator includes a stator side facing part that faces the movable element in the direction of the axis line; and the gel damper member is placed between the stator side facing part and the movable element in the direction of the axis line.

In at least an embodiment of the invention, it is preferable that a needle entering level of the gel damper member is a level of 90 to 110. According to the configuration, the gel damper member has sufficient elasticity for demonstrating a damper function, and moreover it is unlikely that the gel damper member becomes fractured and flies off.

In at least an embodiment of the invention, employed may be a configuration in which the movable element includes a shaft part protruding toward the stator side facing part on the center line, and the gel damper member is placed between an end surface of the shaft part at a side toward the stator side facing part, and the stator side facing part, in the direction of the axis line.

In at least an embodiment of the invention, employed may be a configuration in which the movable element includes a shaft part protruding toward the stator side facing part on the center line, and the gel damper member is placed in such a way as to surround the shaft part.

In at least an embodiment of the invention, employed may be a configuration in which the movable element includes: a shaft that constitutes the shaft part with one end of the shaft; a permanent magnet constituting the magnetic drive mechanism and having a center hole formed, inside which the shaft is set; a yoke that is provided with an end plate part contacting the permanent magnet at one side in the direction of the axis line, and a cylinder part covering the permanent magnet at an outside in a radial direction; and a washer that contacts a circumference of the center hole of the permanent magnet, at the other side in the direction of the axis line; and the shaft is welded to the end plate part at the one side in the direction of the axis line, and welded to the washer at the other side in the direction of the axis line.

In at least an embodiment of the invention, employed may be a configuration in which the stator has a supporting shaft that stretches on the center line; the movable element has a shaft hole, which stretches on the center line, and inside which the supporting shaft is placed; and the gel damper member is cylindrically placed between an outer circumferential surface of the supporting shaft and an inner circumferential surface of the shaft hole.

In this case, employed may be a configuration in which the movable element includes: a tubular sleeve provided with the shaft hole; a permanent magnet constituting the magnetic drive mechanism and having a center hole formed, inside which the tubular sleeve is set; a yoke that is provided with an end plate part contacting the permanent magnet at one side in the direction of the axis line, and a cylinder part covering the permanent magnet at an outside in a radial direction; and a washer that contacts a circumference of the center hole of the permanent magnet, at the other side in the direction of the axis line; and the tubular sleeve is welded to the end plate part at the one side in the direction of the axis line, and welded to the washer at the other side in the direction of the axis line.

In at least an embodiment of the invention, it is preferable that the gel damper member is made from silicone gel.

In order to solve the problems described above, a linear actuator according to at least an embodiment of the invention includes: a stator; a movable element; a spring member connected to the movable element and the stator, in order to support the movable element in such a way as to be movable with respect to the stator in a direction of an axis line: a magnetic drive mechanism for driving the movable element in the direction of the axis line; and a gel damper member placed between the stator and the movable element; wherein, a position of a gravity center of the movable element and a connecting position of the spring member in relation to the movable element are distant from each other in the direction of the axis line.

In at least an embodiment of the invention, the magnetic drive mechanism is employed for driving the movable element, and the spring member is connected between the movable element and the stator. Therefore, the movable element can be driven in the direction of the axis line, by making use of a driving force by the magnetic drive mechanism and a biasing force by the spring member. Even according to this configuration, since the gel damper member is provided between the stator and the movable element in at least an embodiment of the present invention, a resonance of the movable element can be suppressed. Moreover, since the position of the gravity center of the movable element and the connecting position of the spring member in relation to the movable element are distant from each other in the direction of the axis line, a force of displacing in a radial direction is added to the spring member even when a tilting vibration occurs in the movable element. Therefore, since the tilting vibration in the movable element is just less, it is possible to suppress noise generation and a decrease in reliability, owing to a collision between the movable element and the stator, which is attributable to the tilting vibration in the movable element.

In at least an embodiment of the invention, employed may be a configuration in which the spring member is a plate-like spring component having its thickness direction in a direction along the direction of the axis line; and the spring member comprises: a stator side connection part connected to the stator; a movable element side connection part connected to the movable element; and an arm part connected to the stator side connection part and the movable element side connection part. According to the configuration, an area occupied by the spring member can be narrowed in the direction of the axis line. Furthermore, a force of displacing in a radial direction is added to the arm part of the spring member at a time when a tilting vibration occurs in the movable element; and under the condition, a resonant frequency with respect to a displacement in the radial direction of the arm part is high. Therefore, a resonance is unlikely generated even when the tilting vibration occurs in the movable element. Accordingly, since the tilting vibration in the movable element is less, it is possible to suppress noise generation and a decrease in reliability, owing to a collision between the movable element and the stator, which is attributable to the tilting vibration in the movable element.

In at least an embodiment of the invention, employed may be a configuration in which the magnetic drive mechanism includes a permanent magnet provided to the movable element, and a coil provided to the stator and facing the permanent magnet in a radial direction.

In at least an embodiment of the invention, it is preferable that the gel damper member is placed at least, at either one of a position on a center line of the movable element and a group of positions surrounding the center line. According to the configuration, a resonance of the movable element can effectively be suppressed.

In at least an embodiment of the invention, it is preferable that the stator includes a stator side facing part that faces the movable element in the direction of the axis line; and the gel damper member is placed between the stator side facing part and the movable element in the direction of the axis line.

In at least an embodiment of the invention, employed may be a configuration in which the movable element includes a shaft part protruding toward the stator side facing part on the center line, and the gel damper member is placed between an end surface of the shaft part at a side toward the stator side facing part, and the stator side facing part, in the direction of the axis line.

In at least an embodiment of the invention, employed may be a configuration in which the gel damper member is placed at three positions surrounding the center line.

In at least an embodiment of the invention, employed may be a configuration in which the stator has a supporting shaft that stretches on the center line; the movable element has a shaft hole, which stretches on the center line, and inside which the supporting shaft is placed; and the gel damper member is cylindrically placed between an outer circumferential surface of the supporting shaft and an inner circumferential surface of the shaft hole.

In at least an embodiment of the invention, it is preferable that the gel damper member is fixed to both the movable element and the stator. According to the configuration, it becomes possible to prevent the gel damper member from displacement in association with the movement of the movable element. Moreover, even when the movable element moves in a direction for becoming distant from the stator at a position where the gel damper member is provided, the gel damper member becomes deformed in association with the movement so that a resonance of the movable element can effectively be suppressed.

In at least an embodiment of the invention, it is preferable that the gel damper member is made from silicone gel.

In at least an embodiment of the invention, it is preferable that a needle entering level of the gel damper member is a level of 90 to 110. According to the configuration, the gel damper member has sufficient elasticity for demonstrating a damper function, and moreover it is unlikely that the gel damper member becomes fractured and flies off.

In at least an embodiment of the invention, the magnetic drive mechanism is employed for driving the movable element, and the spring member is connected between the movable element and the stator. Therefore, the movable element can be driven in the direction of the axis line, by making use of a driving force by the magnetic drive mechanism and a biasing force by the spring member. Even according to this configuration, since the gel damper member is provided between the stator and the movable element in the present embodiment, a resonance of the movable element can be suppressed. Moreover, the gel damper member is provided at least, at either one of a position on the axis line and a group of positions surrounding the axis line, and therefore a resonance of the movable element can effectively be suppressed.

In at least an embodiment of the invention, the magnetic drive mechanism is employed for driving the movable element, and the spring member is connected between the movable element and the stator. Therefore, the movable element can be driven in the direction of the axis line, by making use of a driving force by the magnetic drive mechanism and a biasing force by the spring member. Even according to this configuration, since the gel damper member is provided between the stator and the movable element in at least an embodiment of the present invention, a resonance of the movable element can be suppressed. Moreover, since the position of the gravity center of the movable element and the connecting position of the spring member in relation to the movable element are distant from each other in the direction of the axis line, the tilting vibration in the movable element is just less even when a tilting vibration occurs in the movable element. Therefore, it is possible to suppress noise generation and a decrease in reliability, owing to a collision between the movable element and the stator, which is attributable to the tilting vibration in the movable element.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments according to the present invention are explained below with reference to the drawings. Incidentally, in the explanation below, an axis line '1' is a center line of a movable element 6, wherein the axis line 'L' goes through a gravity center of the movable element 6. Moreover, in the following explanation; the explanation is made in such a way that; in a direction in which the axis line 'L' stretches (i.e., in an axial direction), a side where the movable element 6 exists is one side 'L1', and on the other hand, a side where a base 4 of a stator 2 exists is the other side 'L2'. Identical drawings are used for explanation, and a common symbol is provided to each common part.

[Description of a First Embodiment]

(General Configuration)

Figure 1A:
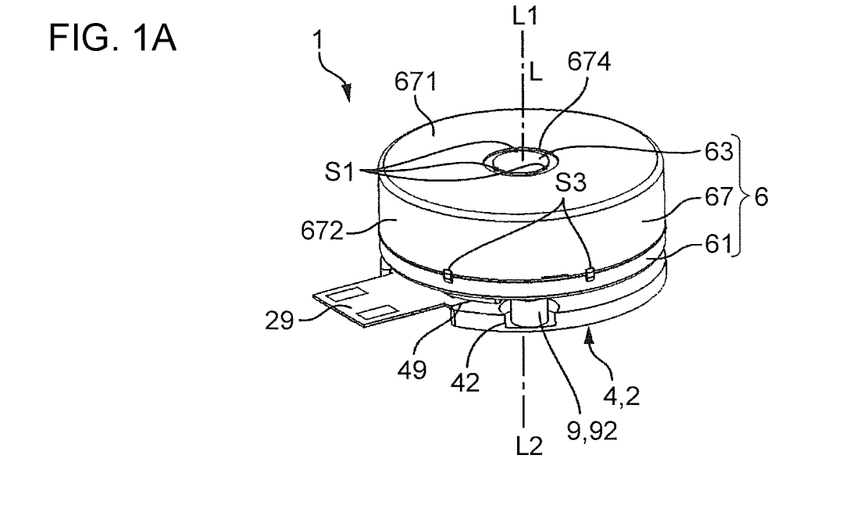
FIGS. 1A & 1B includes explanatory diagrams of a linear actuator according to a first embodiment of the present invention.
Figure 1B:
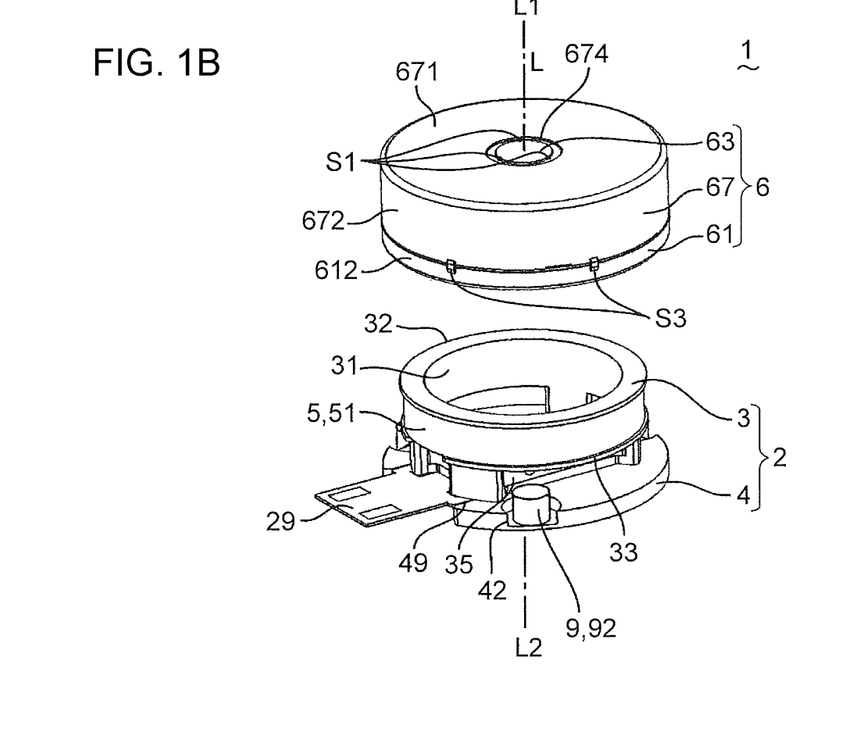
Figure 2:
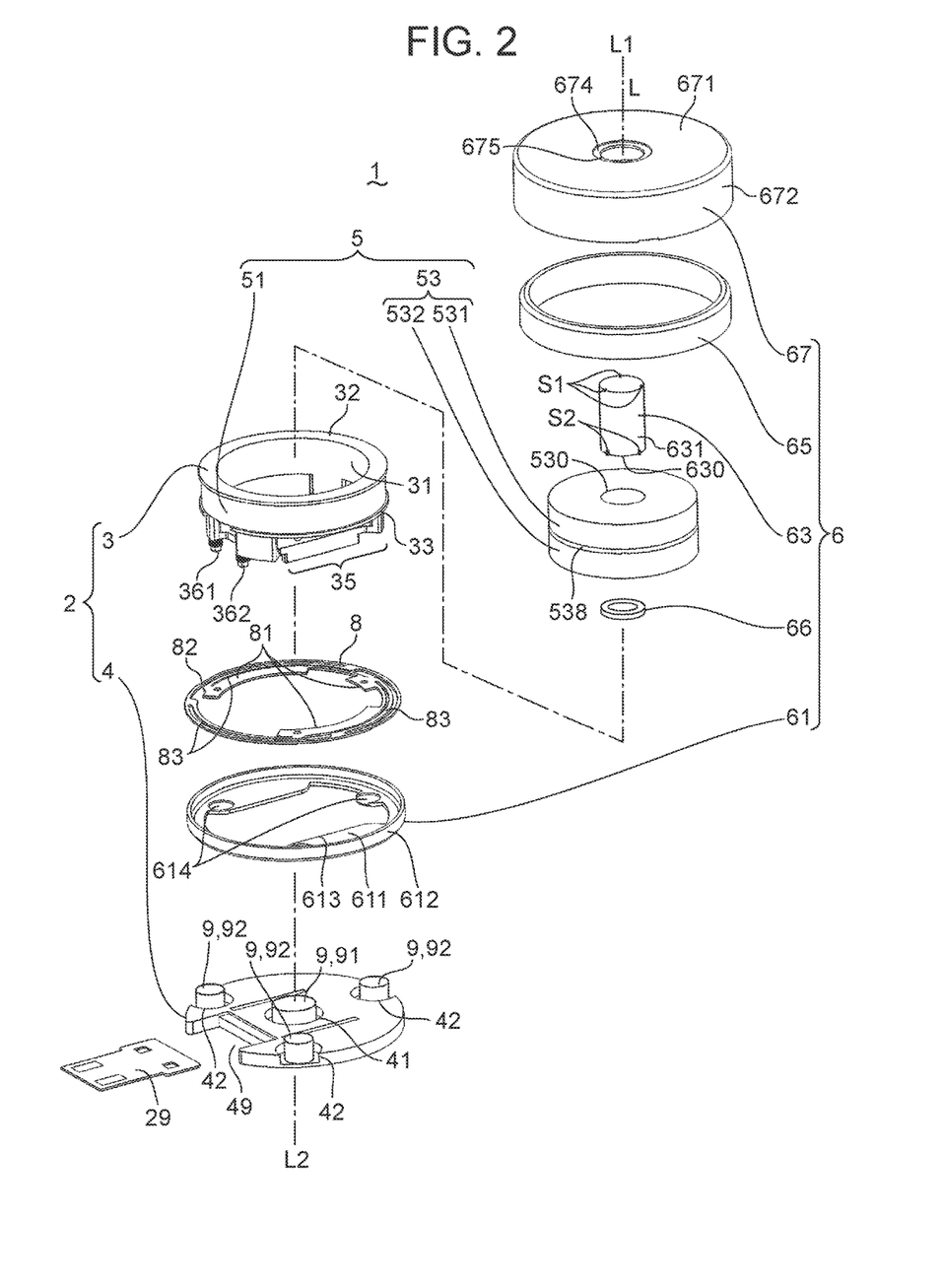
FIG. 2 shows an exploded perspective view of the linear actuator according to the first embodiment of the present invention; the linear actuator being disassembled into detailed parts in the figure.
Figure 3:
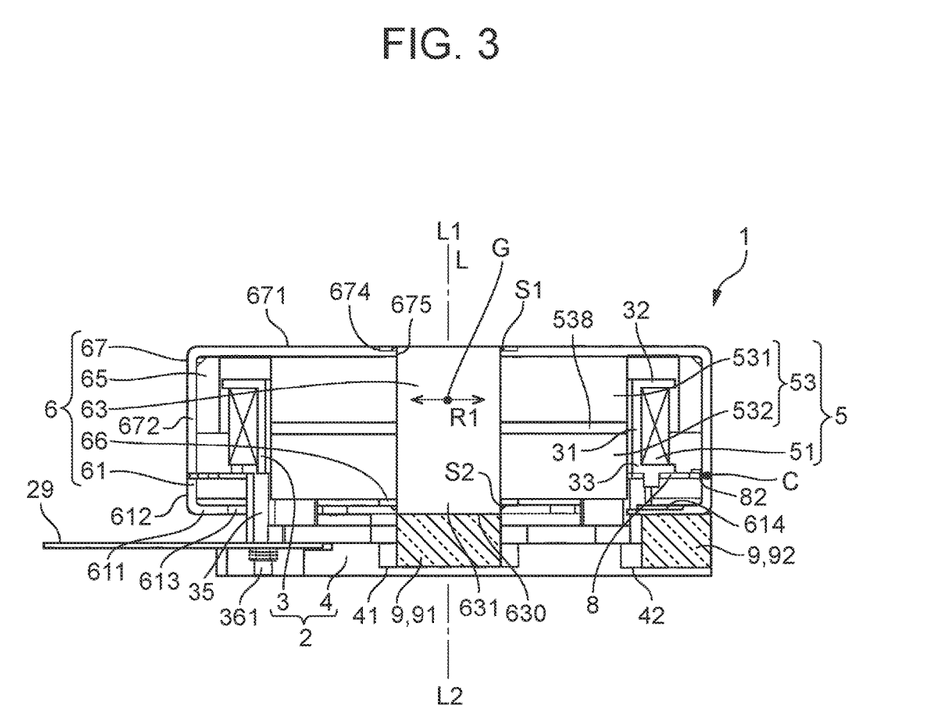
FIG. 3 is a sectional view of the linear actuator according to the first embodiment of the present invention.

FIGS. 1A & 1B include explanatory diagrams of a linear actuator according to a first embodiment of the present invention; wherein FIG. 1A & FIG. 1B are a perspective view of the linear actuator and an exploded perspective view of the linear actuator, respectively. FIG. 2 shows an exploded perspective view of the linear actuator according to the first embodiment of the present invention; the linear actuator being disassembled into detailed parts in the figure. FIG. 3 is a sectional view of the linear actuator according to the first embodiment of the present invention.

As shown in FIGS. 1A & 1B, FIG. 2, and FIG. 3, a linear actuator 1 of the present embodiment includes: a stator 2, a movable element 6, and a spring member 8 connected to the movable element 6 and the stator 2; and then the spring member 8 supports the movable element 6 so as to be movable in a direction of the axis line 'L' with respect to the stator 2. Moreover, the linear actuator 1 includes a magnetic drive mechanism 5 in order to drive the movable element 6 in the direction of the axis line 'L'. The linear actuator 1 of this kind is used, for example, as a device and so on for notifying of an incoming notice and the like by way of vibration, in a mobile phone industrial sector and the like.

(Configuration of the Stator 2)

The stator 2 includes: a coil bobbin 3, on which a coil 51 constituting the magnetic drive mechanism 5 is wound; and the base 4 supporting the coil bobbin 3 at the other side 'L2' (a lower side in the figure) in the direction of the axis line 'L'. The coil bobbin 3 includes: a cylindrical torso part 31 on which the coil 51 is wound; flange parts 32 and 33 having an enlarged diameter at both ends of the torso part 31; and a protrusion 35 protruding out of the torso part 31 continuously, from the flange part 33 toward a side where the base 4 is located; wherein the coil bobbin 3 is connected to the base 4, by the intermediary of the protrusion 35. In the protrusion 35, there are formed terminal parts 361 and 362 around which ends of the coil 51 are coiled, and then the ends of the coil 51 are connected to a circuit board 29 at the terminal parts 361 and 362.

The base 4 is almost disc-like, and a cutout 49 is shaped there in order to place the circuit board 29. In a surface at the one side 'L1' (a higher side in the figure) of the base 4 in the direction of the axis line 'L', there is shaped a circular first recessed part 41 at a center positioned on the axis line 'L'; and in the meantime, there are shaped second recessed parts 42 so as to surround the axis line 'L'. In the present embodiment, there are shaped three second recessed parts 42 in a circumferential direction, so as to surround the axis line 'L'; wherein the three second recessed parts 42 are positioned at equal angular intervals in the circumferential direction; and distances from the axis line 'L' (distances from the first recessed part 41) to the three second recessed parts 42 are equal to one another.

The first recessed part 41 and the second recessed parts 42 are recessed sections for placement of a gel damper member 9 (including a first gel damper member 91 and second gel damper members 92) which is described later.

(Configuration of the Movable Element 6)

The movable element 6 includes: a shaft 63 that is set into a center hole 530 of a permanent magnet 53 constituting the magnetic drive mechanism 5; and a yoke 67 covering the permanent magnet 53; and in the meantime, the shaft 63 stretches on a center line of the movable element 6 (the axis line 'L') in the direction of the axis line 'L'. The yoke 67 includes: a disc-shaped end plate part 671 that contacts the permanent magnet 53 at the one side 'L1' in the direction of the axis line 'L'; and a cylindrical cylinder part 672 that stretches from an outer rim of the end plate part 671 toward the other side 'L2' in the direction of the axis line 'L' and then the cylinder part 672 covers the permanent magnet 53 at an outer side in a radial direction, while having a predetermined clearance from an outer circumferential surface of the permanent magnet 53. In the present embodiment, the movable element 6 has an annular spacer 65 that is fixed, by means of using an adhesive and the like, to an internal surface of the cylinder part 672 and a surface of the end plate part 671 at the other side 'L2' in the direction of the axis line 'L'.

At a center of the end plate part 671 of the yoke 67, there is formed a circular recessed part 674 that is recessed to the other side 'L2' in the direction of the axis line 'L2'; and a hole 675 is shaped at a center of the recessed part 674.

In the present embodiment, an end of the shaft 63 at the one side 'L1' in the direction of the axis line 'L' is welded at a plurality of spots 'S1' in a circumferential direction, under the condition of being set into the hole 675, so that the shaft 63 and the yoke 67 are connected with each other by way of welding.

Moreover, the movable element 6 has a washer 66 that contacts a circumference around the center hole 530 of the permanent magnet 53 at the other side 'L2' in the direction of the axis line 'L'; and in the meantime, an end of the shaft 63 at the other side 'L2' in the direction of the axis line 'L' is welded to a surface of the washer 66 at the other side 'L2' in the direction of the axis line 'L', at a plurality of spots 'S2' in a circumferential direction. As a result of that, the permanent magnet 53 is fixed between the washer 66 and the end plate part 671 of the yoke 67.

In the present embodiment, the permanent magnet 53 is composed of two magnet pieces 531 and 532 that sandwich a disc-shaped core 538 from both sides in the direction of the axis line 'L'.

The movable element 6 has a cover 61 at an end of the other side 'L2' in the direction of the axis line 'L'. The cover 61 includes: a disc-shaped bottom plate part 611, and a side plate part 612 that protrudes from an outer rim of the bottom plate part 611 toward one side 'L1' in the direction of the axis line The bottom plate part 611 is located between the flange part 33 of the coil bobbin 3 and the base 4. Therefore, in the bottom plate part 611, there is formed an opening section 613 that allows the protrusion 35 of the coil bobbin 3 to protrude toward one side 'L1' in the direction of the axis line 'L'. Moreover, in the bottom plate part 611, recessed parts 614 are formed at three locations that overlap the second recessed parts 42 of the base 4.

(Configuration of the Spring Member 8)

The spring member 8 is a plate-like spring component including: a stator side connection part 81 connected to the stator 2; a movable element side connection part 82 connected to the movable element 6; and a plurality of arm parts 83 connected to the stator side connection part 81 and the movable element side connection part 82; and then a thickness direction of the spring member 8 is oriented to a direction along the direction of the axis line 'L'. In the present embodiment, the movable element side connection part 82 is shaped like a ring, and positioned at a side outer in a radial direction than the stator side connection part 81 and the arm parts 83 are. The stator side connection part 81 is divided into three sections in a circumferential direction, and each of the arm parts 83 stretches in the circumferential direction from each of the three divided sections of the stator side connection part 81. All the three divided sections of the stator side connection part 81 are connected to a surface of the flange part 33 of the coil bobbin 3, at the other side 'L2' in the direction of the axis line 'L', by means of adhesion, welding, and the like.

In the present embodiment, the movable element side connection part 82 is sandwiched between the side plate part 612 of the cover 61 and the cylinder part 672 of the yoke 67; and connected to the cover 61 and the yoke 67 by way of welding at a plurality of spots 'S3' in a circumferential direction.

Being connected to the side plate part 612 of the cover 61 and the cylinder part 672 of the yoke 67 by way of welding, the end of the shaft 63 at the other side 'L2' in the direction of the axis line 'L' constitutes a shaft part 631 protruding from the movable element 6 (the cover 61) toward the other side 'L2' (a side toward the base 4) in the direction of the axis line 'L'; and then an end surface 630 of the shaft part 631 at the other side 'L2' in the direction of the axis line 'L' (the end surface 630 at a side toward the base 4) faces the first recessed part 41 of the base 4 at one side 'L1' in the direction of the axis line 'L'.

In the arm parts 83 of the spring member 8 (a plate-like spring component) configured in this way, a spring constant with respect to a displacement in a radial direction of the movable element 6 is greater than a spring constant with respect to a displacement in the direction of the axis line 'L' of the movable element 6. Accordingly, in the arm parts 83 of the spring member 8, a resonant frequency with respect to a displacement in the radial direction of the movable element 6 is higher than a resonant frequency with respect to a displacement in the direction of the axis line 'L' of the movable element 6.

(Positional Relationship Between a Gravity Center 'G' of the Movable Element 6 and a Connecting Position 'C' of the Spring Member 8 in Relation to the Movable Element 6)

In the linear actuator 1 according to the present embodiment; in the movable element 6, the shaft 63 is set in the center hole 530 of the permanent magnet 53, and meanwhile the end plate part 671 of the yoke 67 contacts the permanent magnet 53 at the one side 'L1' in the direction of the axis line 'L'. Moreover, in the movable element 6, the cover 61 is connected to the cylinder part 672 of the yoke 67. Therefore, the gravity center 'G' of the movable element 6 (refer to FIG. 3) is located at a side closer to one side 'L1' on the axis line 'L', than a center of the shaft 63 in the direction of the axis line 'L' is. As a result of that, the gravity center 'G' of the movable element 6 is located at the side closer to the one side 'L1' in the direction of the axis line 'L' than a magnetic center of the magnetic drive mechanism 5 (a center position of the permanent magnet 53 in the direction of the axis line 'L' i.e., a position of the core 538) in the direction of the axis line 'L' is. On this occasion, the movable element side connection part 82 of the spring member 8 is sandwiched between the side plate part 612 of the cover 61 and an end of the cylinder part 672 of the yoke 67 at the other side 'L2'. Therefore, a connecting position 'C' (refer to FIG. 3) of the spring member 8 in relation to the movable element 6 is located at a side closer to the other side 'L2' in the direction of the axis line 'L', than the gravity center 'G' of the movable element 6 is; and then, a position of the gravity center 'G' of the movable element 6 and the connecting position 'C' of the spring member 8 in relation to the movable element 6 are distant from each other in the direction of the axis line 'L'.

(Configuration of the Gel Damper Member 9)

In the linear actuator 1 according to the present embodiment; there is placed the gel damper member 9 between the stator 2 and the movable element 6. The gel damper member 9 is placed at least, at either one of a position on the axis line 'L' and a group of positions surrounding the axis line 'L' between the stator 2 and the movable element 6. In the present embodiment, the gel damper member 9 is placed at both the position on the axis line 'L' and the group of positions surrounding the axis line 'L', between the stator 2 and the movable element 6.

More specifically to describe; in the stator 2, the base 4 is a stator side facing part that faces the movable element 6 at the other side 'L2' in the direction of the axis line 'L'; and in the direction of the axis line 'L', there is placed the gel damper member 9 between the base 4 and the movable element 6.

According to the present embodiment, at the first recessed part 41 of the base 4, there is placed the first gel damper member 91 being columnar, as the gel damper member 9. The first gel damper member 91 is positioned between the end surface 630 of the shaft part 631 of the shaft 63 protruding from the movable element 6 on the axis line 'L' and the base 4. Therefore, the first gel damper member 91 is placed at a side opposite to the gravity center 'G' in relation to the connecting position 'C' of the spring member 8, in the direction of the axis line 'L'. The first gel damper member 91 is fixed, by way of having a surface, at one side 'L1' in the direction of the axis line 'L', fixed to the end surface 630 of the shaft 63 with adhesive; and in the meantime, a surface at the other side 'L2' is fixed to a bottom of the first recessed part 41 of the base 4 with adhesive.

Moreover, at the three second recessed parts 42 of the base 4, there are individually placed the second gel damper members 92 being columnar, as the gel damper member 9. The second gel damper members 92 are positioned between the cover 61 of the movable element 6 and the base 4, in the direction of the axis line 'L'. Therefore, the second gel damper members 92 are placed at a side opposite to the gravity center 'G' in relation to the connecting position 'C' of the spring member 8, in the direction of the axis line 'L'.

The second gel damper members 92 are so placed as to surround the axis line 'L'. More specifically to describe, the second recessed parts 42 of the base 4 are shaped at three locations surrounding the axis line 'L' in such a way as to be positioned at equal angular intervals in the circumferential direction; and meanwhile, the second gel damper members 92 are positioned at three locations surrounding the axis line 'L' in such a way as to be positioned at equal angular intervals in the circumferential direction. The second gel damper members 92 individually adhere to, by way of having each surface at one side 'L1' in the direction of the axis line 'L' adhere to a reverse side surface of a position where each of the recessed parts 614 is formed in the cover 61; and having each surface at the other side 'L2' adhere to each bottom of the second recessed parts 42 of the base 4.

In the present embodiment, the gel damper member 9 is made from silicone gel having a needle entering level of 90 to 110. The needle entering level shows a value of an entered depth of a ¼-cone needle stressed for five seconds, with a total load of 9.38 grams at 25 degrees Celsius, as specified in JIS-K-2207 or JIS-K-2220; wherein the entered depth being expressed in ¹⁄₁₀ mm The smaller the value is, the harder the material is.

(Movement)

In the linear actuator 1 according to the present embodiment; while energizing the coil 51 is halted, the movable element 6 is located at an origin position where a mass of the movable element 6 is balanced with a retaining force (a biasing force) of the spring member 8. Then, if the coil 51 is energized under the condition, the movable element 6 receives a driving force by the magnetic drive mechanism 5 in such a way as to move toward one side 'L1' in the direction of the axis line 'L', against the biasing force of the spring member 8. A moving displacement stroke at the time is determined on the basis of a current value of a current supplied to the coil 51 and the biasing force of the spring member 8. Then, if energizing the coil 51 stops, the movable element 6 returns to the origin position by the biasing force of the spring member 8. Therefore, if the coil 51 is energized intermittently, the movable element 6 repeats a reciprocating movement in the direction of the axis line 'L'.

Moreover, if the coil 51 is supplied with a certain current, the movable element 6 stops at a position determined on the basis of a current value of the current supplied to the coil 51 and the biasing force of the spring member 8.

(Movement and Primary Effect of the Present Embodiment According to at Least an Embodiment of the Invention)

In the linear actuator 1 according to the present embodiment; while energizing the coil 51 is halted, the movable element 6 is located at the origin position where the mass of the movable element 6 is balanced with the retaining force (a biasing force) of the spring member 8. Then, if the coil 51 is energized under the condition, the movable element 6 receives a driving force by the magnetic drive mechanism 5 in such a way as to move toward one side 'L1' in the direction of the axis line 'L', against the biasing force of the spring member 8. The moving displacement stroke at the time is determined on the basis of the current value of the current supplied to the coil 51 and the biasing force of the spring member 8. Then, if energizing the coil 51 stops, the movable element 6 returns to the origin position by the biasing force of the spring member 8. Therefore, if the coil 51 is energized intermittently, the movable element 6 repeats a reciprocating movement in the direction of the axis line 'L'.

Moreover, if the coil 51 is supplied with a certain current, the movable element 6 stops at a position determined on the basis of a current value of the current supplied to the coil 51 and the biasing force of the spring member 8.

In the linear actuator 1 according to the present embodiment; being dependent on a frequency at a time of a reciprocating movement of the movable element 6, the movable element 6 sometimes resonates at a frequency corresponding to the mass of the movable element 6 and a spring constant of the spring member 8. Meanwhile, in the present embodiment, the gel damper member 9 (including the first gel damper member 91 and the second gel damper members 92) is provided between the base 4 (the stator side facing part) of the stator 2 and the cover 61 of the movable element 6; and being deformed in conformity with a moving displacement of the movable element 6, such a gel damper member 90 absorbs a vibration of the movable element 6. Therefore, a resonance of the movable element 6 can be suppressed.

Then, among the gel damper member 9, the first gel damper member 91 is provided at a position on a center line of the movable element 6 (the axis line 'L'), and meanwhile the second gel damper members 92 are provided at three positions surrounding the center line of the movable element 6 (the axis line 'L'). Accordingly, the gel damper member 9 can effectively suppress a resonance of the movable element 6.

Then, the gel damper member 9 (including the first gel damper member 91 and the second gel damper members 92) is adhered and fixed to both the movable element 6 and the stator 2. Therefore, it becomes possible to prevent the gel damper member 9 from displacement in association with the movement of the movable element 6. Moreover, even when the movable element 6 moves in a direction for becoming distant from the stator 2 at the positions where the gel damper member 9 is provided, the gel damper member 9 becomes deformed in association with the movement so that the resonance of the movable element 6 can effectively be suppressed.

Then, the gel damper member 9 has a needle entering level of 90 to 110. Therefore, the gel damper member 9 has sufficient elasticity for demonstrating a damper function, and moreover it is unlikely that the gel damper member 9 becomes fractured and flies off.

Furthermore, in the present embodiment, the spring member 8 is a plate-like spring component, and therefore the spring member 8 occupies only a narrow area in the direction of the axis line 'L'.

(Primary Effect of the Present Embodiment)

In the linear actuator 1 according to the present embodiment; being dependent on a frequency at a time of a reciprocating movement of the movable element 6, the movable element 6 sometimes resonates at the frequency corresponding to the mass of the movable element 6 and the spring constant of the spring member 8. Meanwhile, in the present embodiment, the gel damper member 9 (including the first gel damper member 91 and the second gel damper members 92) is provided between the base 4 (the stator side facing part) of the stator 2 and the cover 61 of the movable element 6; and being deformed in conformity with a moving displacement of the movable element 6, such a gel damper member 90 absorbs a vibration of the movable element 6. Therefore, a resonance of the movable element 6 can be suppressed.

Then, in the linear actuator 1 according to the present embodiment; the position of the gravity center 'G' of the movable element 6 and the connecting position 'C' of the spring member 8 in relation to the movable element 6 are distant from each other in the direction of the axis line 'L'. Therefore, at a time of vibrating the movable element 6 in the direction of the axis line 'L'; even when a tilting vibration illustrated with an arrow 'R1' in FIG. 3 occurs in the movable element 6 owing to a displacement between a thrusting force acting on the movable element 6 and the gravity center 'G' of the movable element 6, a force of displacing in a radial direction is added to the arm parts 83 of the spring member 8, and meanwhile a force of displacing in the direction of the axis line 'L' is less. On this occasion, in the arm parts 83 of the spring member 8, the resonant frequency with respect to a displacement in the radial direction of the movable element 6 is higher than the resonant frequency with respect to a displacement in the direction of the axis line 'L' of the movable element 6; so that a resonance is unlikely generated even when the tilting vibration occurs in the movable element 6. Accordingly, since the tilting vibration in the movable element 6 is less, it is possible to suppress noise generation and a decrease in reliability, owing to a collision between the movable element 6 and the stator 2, which is attributable to the tilting vibration in the movable element 6.

Then, among the gel damper member 9, the first gel damper member 91 is provided at a position on a center line of the movable element 6 (the axis line 'L'), and meanwhile the second gel damper members 92 are provided at three positions surrounding the center line of the movable element 6 (the axis line 'L'). Accordingly, the gel damper member 9 can effectively suppress a resonance of the movable element 6.

Then, the gel damper member 9 (including the first gel damper member 91 and the second gel damper members 92) is fixed to both the movable element 6 and the stator 2. Therefore, it becomes possible to prevent the gel damper member 9 from displacement in association with the movement of the movable element 6. Moreover, even when the movable element 6 moves in a direction for becoming distant from the stator 2 at the positions where the gel damper member 9 is provided, the gel damper member 9 becomes deformed in association with the movement so that the resonance of the movable element 6 can effectively be suppressed.

Then, the gel damper member 9 has a needle entering level of 90 to 110. Therefore, the gel damper member 9 has sufficient elasticity for demonstrating a damper function, and moreover it is unlikely that the gel damper member 9 becomes fractured and flies off.

Furthermore, in the present embodiment, the spring member 8 is a plate-like spring component, and therefore the spring member 8 occupies only a narrow area in the direction of the axis line 'L'.

[Modifications of the First Embodiment]

Although both the first gel damper member 91 and the second gel damper members 92 are provided in the first embodiment, only either of the above two may be provided.

Although, in the first embodiment described above, the second gel damper members 92 are provided at three locations in the circumferential direction, the second gel damper members 92 may be provided at four or more locations. Furthermore, the second gel damper members 92 may be provided still in such a way as to be annular-shaped.

[Description of a Second Embodiment]

(General Configuration)

Figure 4A:
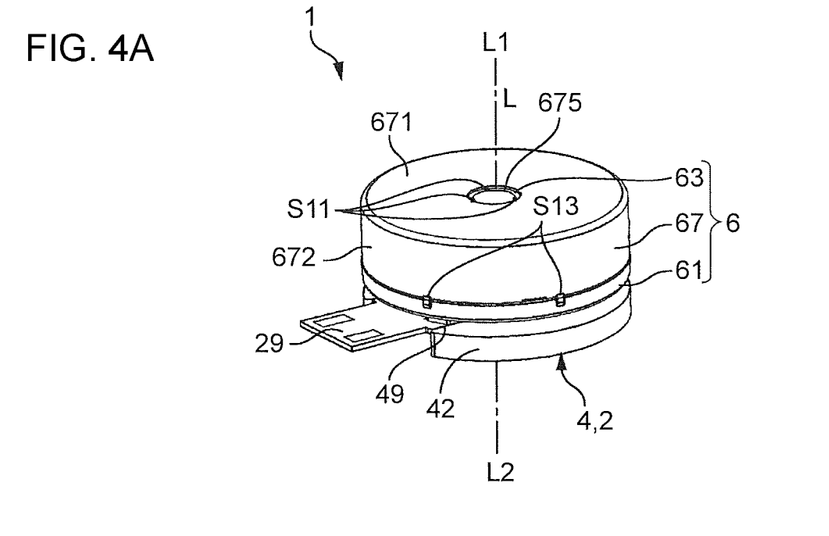
FIGS. 4A & 4B includes explanatory diagrams of a linear actuator according to a second embodiment of the present invention.
Figure 4B:
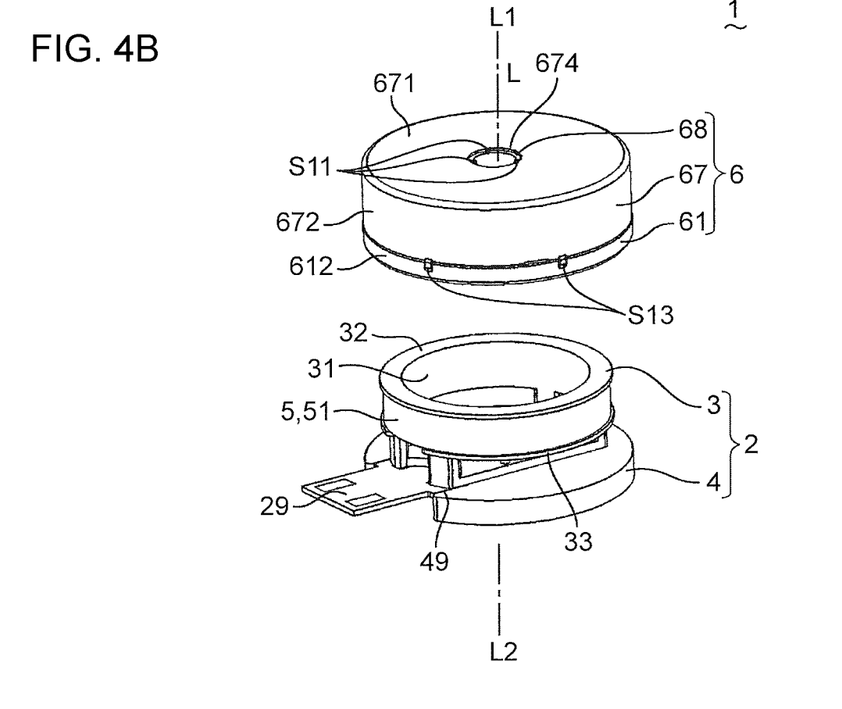
Figure 5:
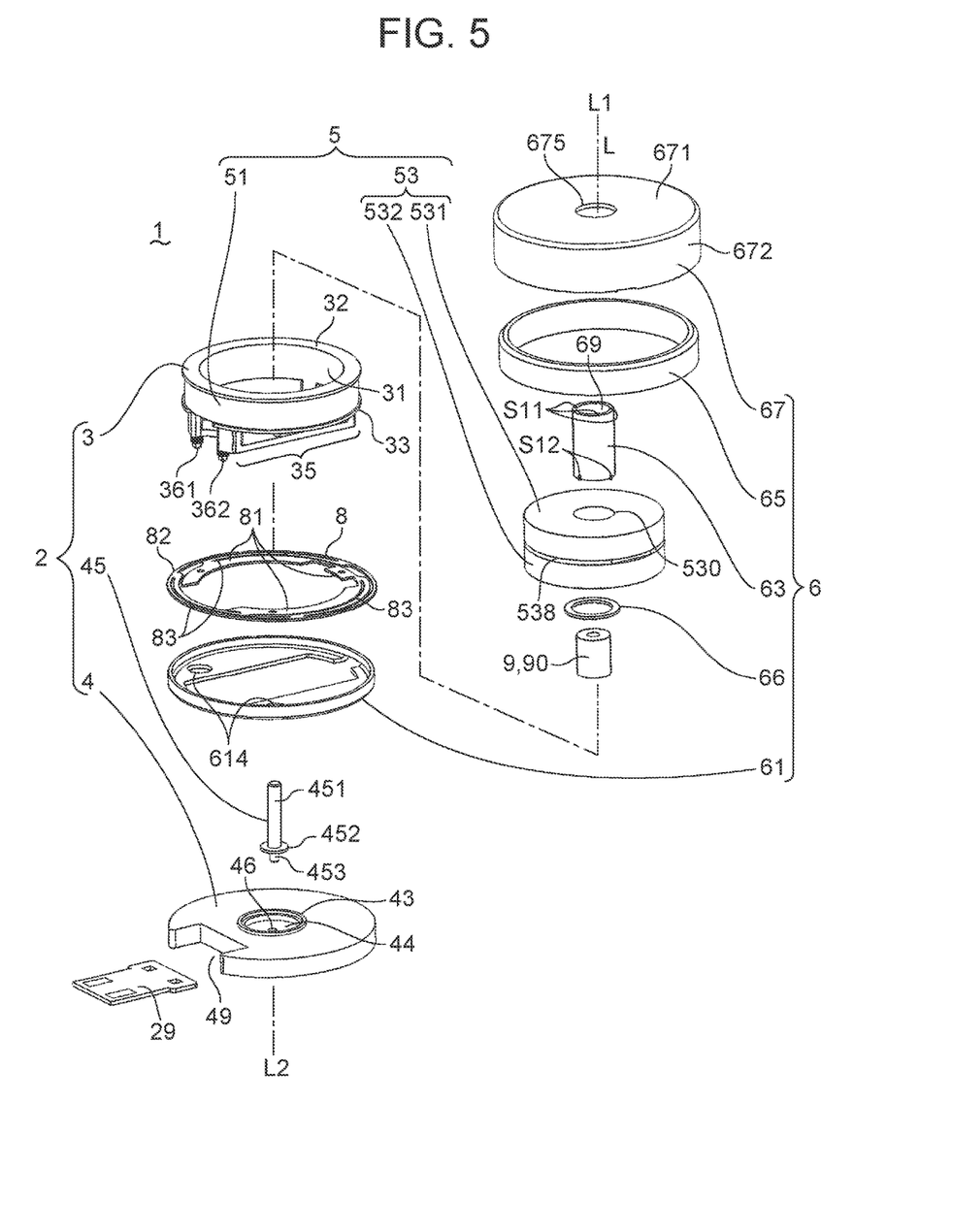
FIG. 5 shows an exploded perspective view of the linear actuator according to the second embodiment of the present invention; the linear actuator being disassembled into detailed parts in the figure.
Figure 6:
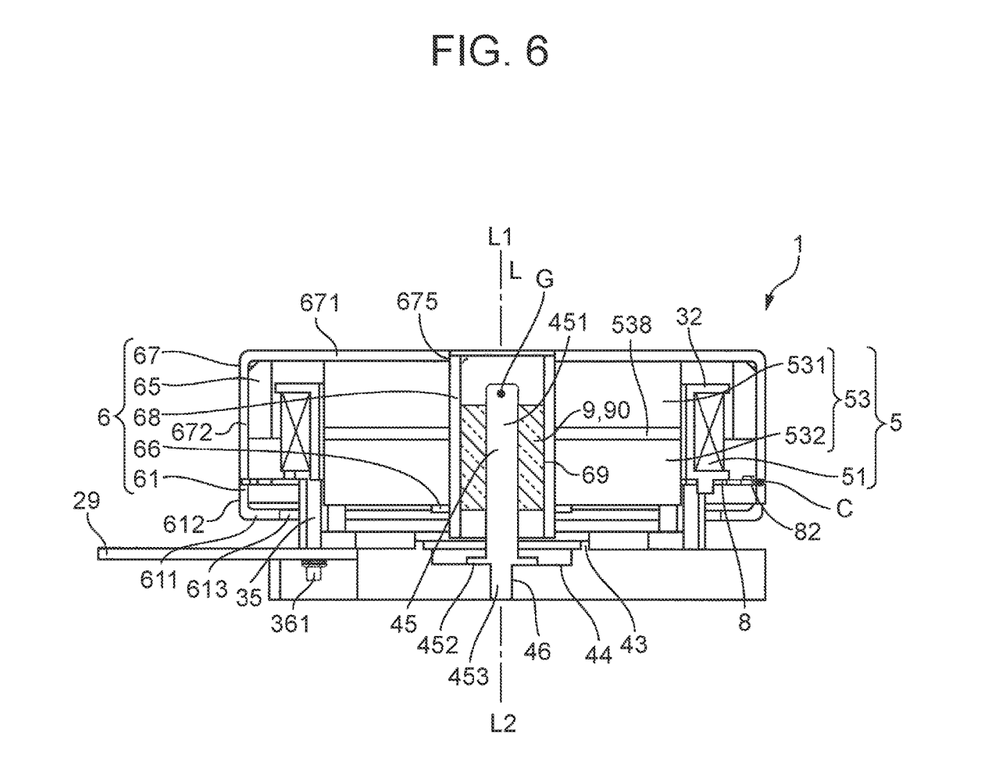
FIG. 6 is a sectional view of the linear actuator according to the second embodiment of the present invention.

FIGS. 4A & 4B includes explanatory diagrams of a linear actuator according to the second embodiment of the present invention (the first and second invention); wherein FIG. 1A, 1B, & FIG. 2 are a perspective view of the linear actuator and an exploded perspective view of the linear actuator, respectively. FIG. 5 shows an exploded perspective view of the linear actuator according to the second embodiment of the present invention; the linear actuator being disassembled into detailed parts in the figure. FIG. 6 is a sectional view of the linear actuator according to the second embodiment of the present invention. Incidentally, a fundamental configuration of the present embodiment is similar to that of the first embodiment, and therefore a common symbol is provided to each common part. Then, in the same manner as for the first embodiment described above, a fundamental configuration of the second embodiment is almost the same as a configuration of the first embodiment, and therefore the identical drawings are used for explanation, and a common symbol is provided to each common part.

As shown in FIGS. 4A & 4B, FIG. 5, and FIG. 6, a linear actuator 1 of the present embodiment includes: a stator 2, a movable element 6, and a spring member 8 connected to the movable element 6 and the stator 2; and then the spring member 8 supports the movable element 6 so as to be movable in a direction of the axis line 'L' with respect to the stator 2. Moreover, the linear actuator 1 includes a magnetic drive mechanism 5 in order to drive the movable element 6 in the direction of the axis line 'L'.

(Configuration of the Stator 2)

The stator 2 includes: a coil bobbin 3, on which a coil 51 constituting the magnetic drive mechanism 5 is wound; and the base 4 supporting the coil bobbin 3 at the other side 'L' in the direction of the axis line 'L'. The coil bobbin 3 includes: a cylindrical torso part 31 on which the coil 51 is wound; flange parts 32 and 33 having an enlarged diameter at both ends of the torso part 31; and a protrusion 35 protruding out of the torso part 31 continuously, from the flange part 33 toward a side where the base 4 is located; wherein the coil bobbin 3 is connected to the base 4, by the intermediary of the protrusion 35. In the protrusion 35, there are formed terminal parts 361 and 362 around which ends of the coil 51 are coiled, and then the ends of the coil 51 are connected to a circuit board 29 at the terminal parts 361 and 362.

The base 4 is almost disc-like, and a cutout 49 is shaped there in order to place the circuit board 29. In the present embodiment, the stator 2 includes a supporting shaft 45 that protrudes from the base 4 toward one side 'L1' in the direction of the axis line 'L' and stretches on the axis line 'L'. The supporting shaft 45 includes: a stabilizing part 453 positioned at the other side 'L2' in the direction of the axis line 'L', a flange part 452 having an enlarged diameter at one side 'L1' of the stabilizing part 453 in the direction of the axis line 'L', and a supporting part 451 protruding from the flange part 452 toward one side 'L1' in the direction of the axis line 'L'; and then the supporting part 451 is thicker than the stabilizing part 453. The supporting part 451 is a section for supporting the movable element 6, and meanwhile the stabilizing part 453 is a section that is retained by the base 4. Specifically to describe, there is shaped a recessed part 44 at a center of the base 4; and there is shaped a hole 46, into which the stabilizing part 453 is set and fixed, at a center of a bottom part of the recessed part 44. Under the condition where the stabilizing part 453 is set into the hole 46, the flange part 452 contacts the bottom part of the recessed part 44 of the base 4. Incidentally, in the base 4, there is shaped an annular rib-like protrusion 43 around the recessed part 44.

(Configuration of the Movable Element 6)

The movable element 6 includes: a tubular sleeve 68 set into a center hole 530 of a permanent magnet 53 constituting the magnetic drive mechanism 5; and a yoke 67 covering the permanent magnet 53. The tubular sleeve 68 is shaped like a tube; and in the movable element 6, there is shaped a shaft hole 69, inside which the supporting shaft 45 is located, with a hole passing through in the direction of the axis line 'L'. The tubular sleeve 68 stretches on the center line of the movable element 6 (the axis line 'L'), in the direction of the axis line 'L'. The yoke 67 includes: a disc-shaped end plate part 671 that contacts the permanent magnet 53 at the one side 'L1' in the direction of the axis line 'L'; and a cylindrical cylinder part 672 that stretches from an outer rim of the end plate part 671 toward the other side 'L2' in the direction of the axis line and then the cylinder part 672 covers the permanent magnet 53 at an outer side in a radial direction, while having a predetermined clearance from an outer circumferential surface of the permanent magnet 53. In the present embodiment, the movable element 6 has an annular spacer 65 that is fixed, by means of using an adhesive and the like, to an internal surface of the cylinder part 672 and a surface of the end plate part 671 at the other side 'L2' in the direction of the axis line 'L'.

At a center of the end plate part 671 of the yoke 67, a hole 675 is formed. An end of the tubular sleeve 68 at the one side 'L1' in the direction of the axis 'L' line is welded at a plurality of spots 'S1' in a circumferential direction, under the condition of being set into the hole 675, so that the tubular sleeve 68 and the yoke 67 are connected with each other by way of the welding.

Moreover, the movable element 6 has a washer 66 that contacts a circumference around the center hole 530 of the permanent magnet 53 at the other side 'L2' in the direction of the axis line 'L'; and in the meantime, an end of the tubular sleeve 68 at the other side 'L2' in the direction of the axis line 'L' is welded to a surface of the washer 66 at the other side 'L2' in the direction of the axis line 'L', at a plurality of spots 'S12' in a circumferential direction. As a result of that, the permanent magnet 53 is fixed between the washer 66 and the end plate part 671 of the yoke 67.

In the present embodiment, the permanent magnet 53 is composed of two magnet pieces 531 and 532 that sandwich a disc-shaped core 538 from both sides in the direction of the axis line 'L'.

Moreover, the movable element 6 has a cover 61 at an end of the other side 'L2' in the direction of the axis line 'L'. The cover 61 includes: a disc-shaped bottom plate part 611, and a side plate part 612 that protrudes from an outer rim of the bottom plate part 611 toward one side 'L1' in the direction of the axis line 'L'. On this occasion, the bottom plate part 611 is located between the flange part 33 of the coil bobbin 3 and the base 4. Therefore, in the bottom plate part 611, there is formed an opening section 613 that allows the protrusion 35 of the coil bobbin 3 to protrude toward one side 'L1' in the direction of the axis line 'L'. Moreover, in the bottom plate part 611, there are formed two recessed parts 614.

(Configuration of the Spring Member 8)

In the same way as to the first embodiment, the spring member 8 is a plate-like spring component including: a stator side connection part 81 connected to the stator 2; a movable element side connection part 82 connected to the movable element 6; and a plurality of arm parts 83 connected to the stator side connection part 81 and the movable element side connection part 82; and then a thickness direction of the spring member 8 is oriented to a direction along the direction of the axis line 'L'. In the present embodiment, the movable element side connection part 82 is shaped like a ring, and positioned at a side outer in a radial direction than the stator side connection part 81 and the arm parts 83 are. The stator side connection part 81 is divided into three sections in a circumferential direction, and each of the arm parts 83 stretches in the circumferential direction from each of the three divided sections of the stator side connection part 81. All the three divided sections of the stator side connection part 81 are connected to a surface of the flange part 33 of the coil bobbin 3, at the other side 'L2' in the direction of the axis line by means of adhesion, welding, and the like.

In the present embodiment, the movable element side connection part 82 is sandwiched between the side plate part 612 of the cover 61 and the cylinder part 672 of the yoke 67; and connected to the cover 61 and the yoke 67 by way of welding at a plurality of spots 'S13' in a circumferential direction.

In the arm parts 83 of the spring member 8 (a plate-like spring component) configured in this way, a spring constant with respect to a displacement in a radial direction of the movable element 6 is greater than a spring constant with respect to a displacement in the direction of the axis line 'L' of the movable element 6. Accordingly, in the arm parts 83 of the spring member 8, a resonant frequency with respect to a displacement in the radial direction of the movable element 6 is higher than a resonant frequency with respect to a displacement in the direction of the axis line of the movable element 6.

(Positional Relationship Between a Gravity Center 'G' of the Movable Element 6 and a Connecting Position 'C' of the Spring Member 8 in Relation to the Movable Element 6)

In the linear actuator 1 according to the present embodiment; in the movable element 6, the tubular sleeve 68 is set in the center hole 530 of the permanent magnet 53, and meanwhile the end plate part 671 of the yoke 67 contacts the permanent magnet 53 at the one side 'L1' in the direction of the axis line 'L'. Moreover, in the movable element 6, the cover 61 is connected to the cylinder part 672 of the yoke 67. Therefore, a gravity center 'G' of the movable element 6 (refer to FIG. 6) is located at a side closer to one side 'L1' on the axis line 'L', than a center of the tubular sleeve 68 in the direction of the axis line 'L' is. As a result of that, the gravity center 'G' of the movable element 6 is located at the side closer to the one side 'L1' in the direction of the axis line 'L', than a magnetic center of the magnetic drive mechanism 5 (a center position of the permanent magnet 53 in the direction of the axis line 'L', i.e., a position of the core 538) in the direction of the axis line 'L' is. On this occasion, the movable element side connection part 82 of the spring member 8 is sandwiched between the side plate part 612 of the cover 61 and an end of the cylinder part 672 of the yoke 67 at the other side 'L'. Therefore, a connecting position 'C' (refer to FIG. 6) of the spring member 8 in relation to the movable element 6 is located at a side closer to the other side 'L2'in the direction of the axis line 'L', than the gravity center 'G' of the movable element 6 is; and then, a position of the gravity center 'G' of the movable element 6 and the connecting position 'C' of the spring member 8 in relation to the movable element 6 are distant from each other in the direction of the axis line 'L'.

(Configuration of the Gel Damper Member 9)

In the linear actuator 1 according to the present embodiment; there is placed the gel damper member 9 between the stator 2 and the movable element 6. The gel damper member 9 is placed at least, at one of a position on the axis line and a position surrounding the axis line between the stator 2 and the movable element 6. In the present embodiment, the gel damper member 9 is placed at the position surrounding the axis line between the stator 2 and the movable element 6.

More specifically to describe, an inner diameter of the shaft hole 69 of the movable element 6 is greater than the supporting shaft 45 of the stator 2, and therefore an inner circumferential surface of the shaft hole 69 and an outer circumferential surface of the supporting shaft 45 are so placed as to have a space between themselves. In other words, under conditions where the supporting shaft 45 of the stator 2 is inserted in the shaft hole 69 of the movable element 6, there is formed a cylindrical space between the inner circumferential surface of the shaft hole 69 and the outer circumferential surface of the supporting shaft 45; and in the present embodiment, the gel damper member 9 is so placed as to fill up the space. Accordingly, the gel damper member 9 is composed of a cylindrical gel damper member 90, which is so placed as to surround the axis line 'L'.

In the present embodiment, an outer circumferential surface of the gel damper member 90 is fixed to the inner circumferential surface of the shaft hole 69 with adhesive; and in the meantime, an inner circumferential surface of the gel damper member 90 is fixed to the outer circumferential surface of the supporting part 451 of the supporting shaft 45 with adhesive. Incidentally, a dimension of the gel damper member 90 in the direction of the axis line 'L' is shorter than the supporting part 451 of the supporting shaft 45. Accordingly, there is a space at both one side 'L1' and the other side 'L2' of the gel damper member 90 in the direction of the axis line 'L'.

In the present embodiment, the gel damper member 9 (the gel damper member 90) is made from silicone gel having a needle entering level of 90 to 110. The needle entering level shows a value of an entered depth of a ¼-cone needle stressed for five seconds, with a total load of 9.38 grams at 25 degrees Celsius, as specified in JIS-K-2207 or JIS-K-2220; wherein the entered depth being expressed in ¹⁄₁₀ mm. The smaller the value is, the harder the material is.

(Movement)

In the same way as to the first embodiment, also in the linear actuator 1 according to the present embodiment; while energizing the coil 51 is halted, the movable element 6 is located at an origin position where a mass of the movable element 6 is balanced with a retaining force (a biasing force) of the spring member 8. Then, if the coil 51 is energized under the condition, the movable element 6 receives a driving force by the magnetic drive mechanism 5 in such a way as to move toward one side 'L1' in the direction of the axis line 'L' against the biasing force of the spring member 8. A moving displacement stroke at the time is determined on the basis of a current value of a current supplied to the coil 51 and the biasing force of the spring member 8. Then, if energizing the coil 51 stops, the movable element 6 returns to the origin position by the biasing force of the spring member 8. Therefore, if the coil 51 is energized intermittently, the movable element 6 repeats a reciprocating movement in the direction of the axis line 'L'.

Moreover, if the coil 51 is supplied with a certain current, the movable element 6 stops at a position determined on the basis of a current value of the current supplied to the coil 51 and the biasing force of the spring member 8.

(Movement and Primary Effect of the Present Embodiment According to at Least an Embodiment of the Invention)

In the same way as to the first embodiment, also in the linear actuator 1 according to the present embodiment; while energizing the coil 51 is halted, the movable element 6 is located at the origin position where the mass of the movable element 6 is balanced with the retaining force (a biasing force) of the spring member 8. Then, if the coil 51 is energized under the condition, the movable element 6 receives a driving force by the magnetic drive mechanism 5 in such a way as to move toward one side 'L1' in the direction of the axis line 'L', against the biasing force of the spring member 8. The moving displacement stroke at the time is determined on the basis of the current value of the current supplied to the coil 51 and the biasing force of the spring member 8. Then, if energizing the coil 51 stops, the movable element 6 returns to the origin position by the biasing force of the spring member 8. Therefore, if the coil 51 is energized intermittently, the movable element 6 repeats a reciprocating movement in the direction of the axis line 'L'.

Moreover, if the coil 51 is supplied with a certain current, the movable element 6 stops at a position determined on the basis of a current value of the current supplied to the coil 51 and the biasing force of the spring member 8.

In the linear actuator 1 according to the present embodiment; being dependent on a frequency at a time of a reciprocating movement of the movable element 6, the movable element 6 sometimes resonates at a frequency corresponding to the mass of the movable element 6 and the spring constant of the spring member 8. Meanwhile, in the present embodiment, the gel damper member 9 (the gel damper member 90) is provided between the supporting shaft 45 of the stator 2 and the tubular sleeve 68 of the movable element 6; and being deformed in conformity with a moving displacement of the movable element 6, the gel damper member 90 absorbs a vibration of the movable element 6. Therefore, a resonance of the movable element 6 can be suppressed.

Then, the gel damper member 9 (the gel damper member 90) is shaped to be cylindrical so as to surround the center line of the movable element 6 (the axis line 'L'). Accordingly, the gel damper member 9 can effectively absorb a vibration of the movable element 6 to suppress a resonance.

Then, the gel damper member 9 (the gel damper member 90) is adhered and fixed to both the movable element 6 and the stator 2. Therefore, it becomes possible to prevent the gel damper member 9 from displacement in association with the movement of the movable element 6.

Furthermore, in the present embodiment, the spring member 8 is a plate-like spring component, and therefore the spring member 8 occupies only a narrow area in the direction of the axis line'L1'.

(Primary Effect of the Present Embodiment)

In the linear actuator 1 according to the present embodiment; being dependent on a frequency at a time of a reciprocating movement of the movable element 6, the movable element 6 sometimes resonates at the frequency corresponding to the mass of the movable element 6 and the spring constant of the spring member 8. Meanwhile, in the present embodiment, the gel damper member 9 (the gel damper member 90) is provided between the supporting shaft 45 of the stator 2 and the tubular sleeve 68 of the movable element 6; and being deformed in conformity with a moving displacement of the movable element 6, the gel damper member 90 absorbs a vibration of the movable element 6. Therefore, a resonance of the movable element 6 can be suppressed.

Then, in the same way as to the first embodiment, also in the linear actuator 1 according to the present embodiment; the position of the gravity center 'G' of the movable element 6 and the connecting position 'C' of the spring member 8 in relation to the movable element 6 are distant from each other in the direction of the axis line 'L'. Therefore, a resonance is unlikely generated even when a tilting vibration occurs in the movable element 6. Accordingly, since the tilting vibration in the movable element 6 is less, it is possible to suppress noise generation and a decrease in reliability, owing to a collision between the movable element 6 and the stator 2, which is attributable to the tilting vibration in the movable element 6.

Then, the gel damper member 9 (the gel damper member 90) is shaped to be cylindrical so as to surround the center line of the movable element 6 (the axis line 'L'). Accordingly, the gel damper member 9 can effectively absorb a vibration of the movable element 6 to suppress a resonance.

Then, the gel damper member 9 (the gel damper member 90) is fixed to both the movable element 6 and the stator 2. Therefore, it becomes possible to prevent the gel damper member 9 from displacement in association with the movement of the movable element 6.

Furthermore, in the present embodiment, the spring member 8 is a plate-like spring component, and therefore the spring member 8 occupies only a narrow area in the direction of the axis line 'L'.

[Other Embodiments]

Incidentally, although the embodiments described above employ a structure in which the gel damper member 9 is fixed by use of adhesive, employed may be another method in which a precursor for forming the gel damper member 9 is first provided, and then the precursor is turned into a gel, in such a way that the gel damper member 9 is fixed by use of an adhesive force of the gel damper member 9 itself. For example, in the second embodiment; after a ultraviolet cure precursor for forming the gel damper member 9 is first provided, the precursor may be turned into a gel by way of ultraviolet light irradiation in such a way that the gel damper member 9 is fixed by use of an adhesive force of the gel damper member 9 itself.

Although, in the embodiments described above, the gel damper member 9 is placed at a side opposite to the gravity center 'G' in relation to the connecting position 'C' of the spring member 8 to the movable element 6, in the direction of the axis line 'L'; the gel damper member 9 may be placed at the same side as to the gravity center 'G' in relation to the connecting position 'C' of the spring member 8 to the movable element 6, in the direction of the axis line 'L'.

Although, in the embodiments described above, the coil 51 provided to the stator 2 faces the permanent magnet 53 provided to the movable element 6 in the magnetic drive mechanism 5 at an outer side in a radial direction, the present invention may be employed in a linear actuator 1 in which the permanent magnet 53 provided to the stator 2 faces the coil 51 provided to the movable element 6 at an outer side in a radial direction.

Although, in the embodiments described above, the gel damper member 9 is fixed to the movable element 6 and the stator 2 by way of adhesion, the gel damper member 9 may be fixed to the movable element 6 and the stator 2 by way of a method other than adhesion, such as embedding, fusing, baking, and the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear actuator comprising: a stator; a movable element; a spring member connected to the movable element and the stator, and structured to support the movable element in such a way as to be movable with respect to the stator in a direction of an axis line: a magnetic drive mechanism structured to drive the movable element in the direction of the axis line; and a gel damper member placed position on a center line of the movable element or one of a group of positions surrounding the center line, between the stator and the movable element; wherein the gel damper member is adhered and fixed to both the movable element and the stator, wherein, the stator comprises a supporting shaft that stretches on the center line; the movable element comprises a shaft hole, which stretches on the center line, and inside which the supporting shaft is placed; and the gel damper member is cylindrically placed between an outer circumferential surface of the supporting shaft and an inner circumferential surface of the shaft hole.

2. The linear actuator according to claim 1;
wherein, the spring member is a plate-like spring component comprising: a stator side connection part connected to the stator; a movable element side connection part connected to the movable element; and an arm part connected to the stator side connection part and the movable element side connection part.

3. The linear actuator according to claim 1;
wherein, the stator comprises a stator side facing part that faces the movable element in the direction of the axis line; and
the gel damper member is placed between the stator side facing part and the movable element in the direction of the axis line.

4. The linear actuator according to claim 3;
wherein, a needle entering level of the gel damper member is a level of 90 to 110 as specified in the JIS-K-2207 standard or the JIS-K-2220 standard.

5. The linear actuator according to claim 3;
wherein, the movable element comprises a shaft part protruding toward the stator side facing part on the center line, and
the gel damper member is placed between an end surface of the shaft part at a side toward the stator side facing part, and the stator side facing part, in the direction of the axis line.

6. The linear actuator according to claim 3;
wherein, the movable element comprises a shaft part protruding toward the stator side facing part on the center line, and
the gel damper member is placed in such a way as to surround the shaft part.

7. The linear actuator according to claim 3;
wherein, the movable element comprises; a shaft that constitutes the shaft part with one end of the shaft; a permanent magnet constituting the magnetic drive mechanism and having a center hole formed, inside which the shaft is set; a yoke that is provided with an end plate part contacting the permanent magnet at one side in the direction of the axis line, and a cylinder part covering the permanent magnet at an outside in a radial direction; and a washer that contacts a circumference of the center hole of the permanent magnet, at the other side in the direction of the axis line; and
the shaft is welded to the end plate part at the one side in the direction of the axis line, and welded to the washer at the other side in the direction of the axis line.

8. The linear actuator according to claim 3;
wherein, the gel damper member is made from silicone gel.

9. The linear actuator according to claim 1; wherein, the movable element comprises: a tubular sleeve provided with the shaft hole; a permanent magnet constituting the magnetic drive mechanism and having a center hole formed, inside which the tubular sleeve is set; a yoke that is provided with an end plate part contacting the permanent magnet at one side in the direction of the axis line, and a cylinder part covering the permanent magnet at an outside in a radial direction; and a washer that contacts a circumference of the center hole of the permanent magnet, at the other side in the direction of the axis line; and the tubular sleeve is welded to the end plate part at the one side in the direction of the axis line, and welded to the washer at the other side in the direction of the axis line.

10. A linear actuator comprising: a stator; a movable element; a spring member connected to the movable element and the stator, and structured to support the movable element in such a way as to be movable with respect to the stator in a direction of an axis line: a magnetic drive mechanism structured to drive the movable element in the direction of the axis line; and a gel damper member placed between the stator and the movable element; wherein, a position of a gravity center of the movable element and a connecting position of the spring member in relation to the movable element are distant from each other in the direction of the axis line; wherein the gel damper member is fixed to both the movable element and the stator, wherein, the stator comprises a supporting shaft that stretches on the center line; the movable element comprises a shaft hole, which stretches on the center line, and inside which the supporting shaft is placed; and the gel damper member is cylindrically placed between an outer circumferential surface of the supporting shaft and an inner circumferential surface of the shaft hole.

11. The linear actuator according to claim 10;
wherein, the spring member is a plate-like spring component having its thickness direction in a direction along the direction of the axis line; and the spring member comprises: a stator side connection part connected to the stator; a movable element side connection part connected to the movable element; and an arm part connected to the stator side connection part and the movable element side connection part.

12. The linear actuator according to claim 10;
wherein, the magnetic drive mechanism comprises a permanent magnet provided to the movable element, and a coil provided to the stator and facing the permanent magnet in a radial direction.

13. The linear actuator according to claim 10;
wherein, the gel damper member is placed at least, at either one of a position on a center line of the movable element or one of a group of positions surrounding the center line.

14. The linear actuator according to claim 13;
wherein, the stator comprises a stator side facing part that faces the movable element in the direction of the axis line; and
the gel damper member is placed between the stator side facing part and the movable element in the direction of the axis line.

15. The linear actuator according to claim 14;
wherein, the movable element comprises a shaft part protruding toward the stator side facing part on the center line, and the gel damper member is placed between an end surface of the shaft part at a side toward the stator side facing part, and the stator side facing part, in the direction of the axis line.

16. The linear actuator according to claim 14;
wherein, the gel damper member is placed at three positions surrounding the center line.

17. The linear actuator according to claim 13;
wherein, the stator comprises a supporting shaft that stretches on the center line;
the movable element comprises a shaft hole, which stretches on the center line, and inside which the supporting shaft is placed; and
the gel damper member is cylindrically placed between an outer circumferential surface of the supporting shaft and an inner circumferential surface of the shaft hole.

18. The linear actuator according to claim 10;
wherein, the gel damper member is made from silicone gel.

19. The linear actuator according to claim 10;
wherein, a needle entering level of the gel damper member is a level of 90 to 110 as specified in the JIS-K-2207 standard or the JIS-K-2220 standard.

20. A linear actuator comprising:
a stator;
a movable element;
a spring member connected to the movable element and the stator, and structured to support the movable element in such a way as to be movable with respect to the stator in a direction of an axis line:
a magnetic drive mechanism structured to drive the movable element in the direction of the axis line; and
a gel damper member placed position on a center line of the movable element or one of a group of positions surrounding the center line, between the stator and the movable element;
wherein the stator comprises a supporting shaft that stretches on the center line;
the movable element comprises a shaft hole, which stretches on the center line, and inside which the supporting shaft is placed; and
the gel damper member is cylindrically placed between an outer circumferential surface of the supporting shaft and an inner circumferential surface of the shaft hole.

21. A linear actuator comprising:
a stator;
a movable element;
a spring member connected to the movable element and the stator, and structured to support the movable element in such a way as to be movable with respect to the stator in a direction of an axis line:
a magnetic drive mechanism structured to drive the movable element in the direction of the axis line; and
a gel damper member placed between the stator and the movable element;
wherein, a position of a gravity center of the movable element and a connecting position of the spring member in relation to the movable element are distant from each other in the direction of the axis line;
wherein the stator comprises a supporting shaft that stretches on the center line;
the movable element comprises a shaft hole, which stretches on the center line, and inside which the supporting shaft is placed; and
the gel damper member is cylindrically placed between an outer circumferential surface of the supporting shaft and an inner circumferential surface of the shaft hole.

* * * * *